United States Patent
Hamajima et al.

(10) Patent No.: US 11,428,315 B2
(45) Date of Patent: Aug. 30, 2022

(54) METHOD OF MANUFACTURING DRIVING DRUM

(71) Applicant: TOYOTA JIDOSHA KABUSHIKI KAISHA, Toyota (JP)

(72) Inventors: Tetsuo Hamajima, Nisshin (JP); Kazuhiro Toyama, Toyota (JP); Shingo Iwatani, Nagoya (JP); Tadashi Takagaki, Toyota (JP); Masataka Umemura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 16/737,162

(22) Filed: Jan. 8, 2020

(65) Prior Publication Data
US 2020/0248803 A1 Aug. 6, 2020

(30) Foreign Application Priority Data

Feb. 1, 2019 (JP) .............................. JP2019-016707

(51) Int. Cl.
*F16H 63/18* (2006.01)
*B23P 15/00* (2006.01)
(Continued)

(52) U.S. Cl.
CPC .............. *F16H 63/18* (2013.01); *B21D 51/02* (2013.01); *B23K 1/0008* (2013.01); *B23P 15/00* (2013.01);
(Continued)

(58) Field of Classification Search
CPC ........ B21D 51/00; B21D 51/10; B21D 51/02; B23K 2101/04; B23K 2101/06;
(Continued)

(56) References Cited

U.S. PATENT DOCUMENTS

| | | | | |
|---|---|---|---|---|
| 5,507,528 | A | * | 4/1996 | Mastrosimone ....... B23K 31/02 285/22 |
| 2005/0127044 | A1 | * | 6/2005 | Nozue .................... B23K 33/00 219/78.02 |

FOREIGN PATENT DOCUMENTS

| | | |
|---|---|---|
| JP | S51-100970 U | 8/1976 |
| JP | S55-106822 A | 8/1980 |

(Continued)

OTHER PUBLICATIONS

Machine Translation of RU 2085350 C1 (Year: 1997).*
U.S. Appl. No. 16/385,024, filed Apr. 16, 2019 in the name of Isamu Shiotsu et al.

*Primary Examiner* — Christopher J Besler
(74) *Attorney, Agent, or Firm* — Oliff PLC

(57) ABSTRACT

A method of manufacturing a driving drum includes: molding a first cylindrical member including first large- and small-diameter parts, a diameter of an outer circumferential surface of the first small-diameter part being smaller than that of the first large-diameter part; molding a second cylindrical member having second large- and small-diameter parts, a diameter of an inner circumferential surface of the second large-diameter part corresponding to the diameter of the outer circumferential surface of the first small-diameter part, a diameter of an inner circumferential surface of the second small-diameter part corresponding to that of the first small-diameter part, and the diameter of the inner circumferential surface of the second small-diameter part being smaller than that of the second large-diameter part; and forming a first cam groove between the first and second small-diameter parts and forming a second cam groove between the first and second large-diameter parts.

4 Claims, 8 Drawing Sheets

(51) Int. Cl.
   *B21D 51/02*   (2006.01)
   *B23K 1/00*    (2006.01)
   *B23P 17/00*   (2006.01)
   *B23P 19/02*   (2006.01)
   *B23K 101/04*  (2006.01)

(52) U.S. Cl.
   CPC ............... *B23P 17/00* (2013.01); *B23P 19/02* (2013.01); *B23K 2101/04* (2018.08)

(58) Field of Classification Search
   CPC .. B23P 15/00; F16H 63/18; F16H 2063/3056; F16H 2063/3073
   See application file for complete search history.

(56) References Cited

FOREIGN PATENT DOCUMENTS

| | | | |
|---|---|---|---|
| JP | 2017-141850 A | 8/2017 | |
| RU | 2085350 C1 * | 7/1997 | ............. B23K 20/16 |

* cited by examiner

METHOD OF MANUFACTURING DRIVING DRUM

CROSS REFERENCE TO RELATED APPLICATIONS

This application is based upon and claims the benefit of priority from Japanese patent application No. 2019-016707, filed on Feb. 1, 2019, the disclosure of which is incorporated herein in its entirety by reference.

BACKGROUND

The present disclosure relates to a method of manufacturing a driving drum for a shift mechanism.

A shift mechanism is known which includes: a driving drum that is disposed on a rotational axis in a rotatable manner, has a cylindrical shape, has a first cam groove formed on an inner circumferential surface in a circumferential direction thereof and a second cam groove formed on an outer circumferential surface in a circumferential direction thereof; a first driven drum that engages with the first cam groove and moves along the rotational axis in accordance with the rotation of the driving drum; and a second driven drum that engages with the second cam groove and moves along the rotational axis in accordance with the rotation of the driving drum.

SUMMARY

In manufacturing the driving drum for the shift mechanism mentioned above, for example, the first and second cam grooves are formed by performing a process for cutting the inner circumferential surface and the outer circumferential surface, respectively, of a cylindrical member by using a cutting tool. However, although the process for cutting the outer circumferential surface is relatively easy, the process for cutting the inner circumferential surface is more laborious since the interference between the cutting tool and the member needs to be considered. Accordingly, a manufacturing time of the driving drum tends to increase.

The present disclosure has been made in order to solve the problem mentioned above and a main object is to provide a method of manufacturing a driving drum by which a driving drum can be manufactured in a short time.

An aspect of the present disclosure for achieving the aforementioned object is a method of manufacturing a driving drum for a shift mechanism, the shift mechanism including:

a driving drum disposed on a rotational axis in a rotatable manner, the driving drum having a cylindrical shape, and including a first cam groove formed on an inner circumferential surface in a circumferential direction thereof and a second cam groove formed on an outer circumferential surface in a circumferential direction thereof;

a first driven drum configured to engage with the first cam groove and move along the rotational axis in accordance with a rotation of the driving drum; and a second driven drum configured to engage with the second cam groove and move along the rotational axis in accordance with the rotation of the driving drum, the method including:

molding a first cylindrical member including a first large-diameter part and a first small-diameter part, a diameter of an outer circumferential surface of the first small-diameter part being smaller than a diameter of an outer circumferential surface of the first large-diameter part;

molding a second cylindrical member having a second large-diameter part and a second small diameter part, a diameter of an inner circumferential surface of the second large-diameter part corresponding to the diameter of the outer circumferential surface of the first small-diameter part of the first cylindrical member, a diameter of an inner circumferential surface of the second small-diameter part corresponding to the diameter of the inner circumferential surface of the first small-diameter part of the first cylindrical member, and the diameter of the inner circumferential surface of the second small-diameter part being smaller than the diameter of the inner circumferential surface of the second large-diameter part; and press-fitting the first small-diameter part of the first cylindrical member into the second large-diameter part of the second cylindrical member, thereby forming the first cam groove between an end face of the first small diameter part of the first cylindrical member and an end face of the second small-diameter part of the second cylindrical member and forming the second cam groove between an end face of the first large-diameter part of the first cylindrical member and an end face of the second large-diameter part of the second cylindrical member.

According to the aspect, a brazing material may be applied to a joint part between the first small-diameter part of the first cylindrical member and the second large-diameter part of the second cylindrical member, and then sintering them.

According to the aspect, a plurality of projections are formed on the outer circumferential surface of the first small-diameter part of the first cylindrical member, and a plurality of recesses are formed on the inner circumferential surface of the second large-diameter part of the second cylindrical member so that the projections of the first small-diameter part of the first cylindrical member are fitted into the recesses of the second large-diameter part of the second cylindrical member, or a plurality of recesses are formed on the outer circumferential surface of the first small-diameter part of the first cylindrical member, and a plurality of projections are formed on the inner circumferential surface of the second large-diameter part of the second cylindrical member so that the recesses of the first small-diameter part of the first cylindrical member are fitted onto the projections of the second large-diameter part of the second cylindrical member.

According to the present disclosure, a method of manufacturing a driving drum by which a driving drum can be manufactured in a short time can be provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
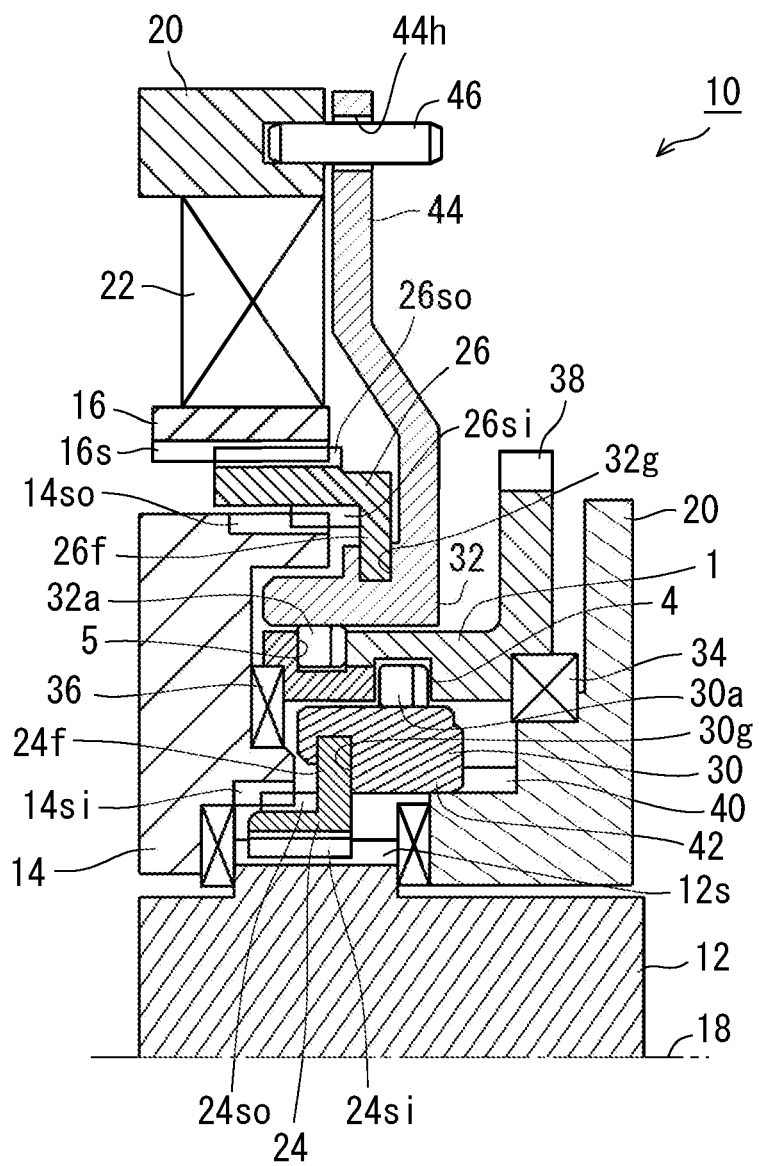
FIG. 1 is a sectional diagram showing a schematic structure of a shift mechanism.

A driving drum according to a first embodiment of the present disclosure is mounted on a shift mechanism for a power transmission apparatus. FIG. 1 is a sectional diagram showing a schematic structure of the shift mechanism. The shift mechanism 10 is a mechanism that switches a power transmission path among first to third transmission shafts 12, 14, and 16.

The first to third transmission shafts 12, 14, and 16 are coaxially disposed around a rotational axis 18 in a rotatable manner. In FIG. 1, parts that are disposed below the rotational axis 18 are omitted since they are formed in a manner substantially similar to the manner that the parts that are disposed above the rotational axis 18 are formed. The first transmission shaft 12 is disposed at an innermost position. The second transmission shaft 14 is disposed so that it surrounds the first transmission shaft 12. The third transmission shaft 16 is disposed on further outerside so that it surrounds the first and second transmission shafts 12 and 14. The first to third transmission shafts 12, 14, and 16 are supported by a case 20 in a rotatable manner.

The state in which the first transmission shaft 12 and the second transmission shaft 14 are connected or disconnected (hereinbelow, referred to as a connected/disconnected state) is switched by the movement of a first shift sleeve 24 in a direction along the rotational axis 18 (hereinbelow, referred to as a rotational axis direction). The connected/disconnected state between the second transmission shaft 14 and the third transmission shaft 16 is switched by the movement of a second shift sleeve 26 in the rotational axis direction. Both the first and second shift sleeves 24 and 26 have an annular shape and are coaxially disposed with respect to the rotational axis 18.

A spline 12$s$ is formed on an outer circumferential surface of the first transmission shaft 12. An inner circumferential spline 24$si$ that engages with the spline 12$s$ of the first transmission shaft 12 is formed on an inner circumferential surface of the first shift sleeve 24. The first shift sleeve 24 rotates integrally with the first transmission shaft 12 when the spline 12$s$ of the first transmission shaft 12 and the inner circumferential spline 24$si$ of the first shift sleeve 24 are engaged with each other.

The first shift sleeve 24 is movable above the spline 12$s$ of the first transmission shaft 12 in the rotational axis direction. The engaged state between the spline 12$s$ and the inner circumferential spline 24$si$ is maintained within the moving range of the first shift sleeve 24. An annular outward flange 24$f$ is disposed on the outer circumferential surface of the first shift sleeve 24.

An inner circumferential spline 14$si$ is formed on an inner circumferential surface of the second transmission shaft 14. An outer circumferential spline 24$so$ capable of engaging with the inner circumferential spline 14$si$ of the second transmission shaft 14 is formed on the outer circumferential surface of the first shift sleeve 24. The engaged state between the outer circumference spline 24$so$ of the first shift sleeve 24 and the inner circumference spline 14$si$ of the second transmission shaft 14 is switched depending on the position of the first shift sleeve 24 in the rotational axis direction.

When the first shift sleeve 24 moves toward the second transmission shaft 14, the outer circumference spline 24$so$ and the inner circumference spline 14$si$ engage with each other. Owing to this engagement, the second transmission shaft 14 rotates integrally with the first transmission shaft 12 through the first shift sleeve 24. On the other hand, when the first shift sleeve 24 separates from the second transmission shaft 14, the engagement between the outer circumferential spline 24$so$ and the inner circumferential spline 14$si$ is released, and the second transmission shaft 14 becomes rotatable about the first transmission shaft 12.

A spline 16$s$ is formed on an inner circumferential surface of the third transmission shaft 16. The outer circumferential spline 26$so$ that engages with the spline 16$s$ of the third transmission shaft 16 is formed on the outer circumferential surface of the second shift sleeve 26. The second shift sleeve 26 rotates integrally with the third transmission shaft 16 when the spline 16$s$ of the third transmission shaft 16 and the outer circumferential spline 26$so$ of the second shift sleeve 26 are engaged with each other.

The second shift sleeve 26 is movable above the spline 16$s$ of the third transmission shaft 16 in the rotational axis direction. The engaged state between the spline 16$s$ and the outer circumferential spline 24$so$ is maintained within the moving range of the second shift sleeve 26. An annular inward flange 26$f$ is disposed on an inner circumferential surface of the second shift sleeve 26.

The outer circumferential spline 14$so$ is formed on the outer circumferential surface of the second transmission shaft 14. An inner circumferential spline 26$si$ capable of engaging with the outer circumferential spline 14$so$ of the second transmission shaft 14 is formed on the inner circumferential surface of the second shift sleeve 26. The engaged state between the inner circumferential spline 26$si$ of the second shift sleeve 26 and the outer circumferential spline 14$so$ of the second transmission shaft 14 is switched depending on the position of the second shift sleeve 26 in the rotational axis direction.

When the second shift sleeve 26 moves toward the second transmission shaft 14, the inner circumferential spline 26$si$ and the outer circumferential spline 14$so$ engage with each other. Owing to this engagement, the third transmission shaft 16 rotates integrally with the second transmission shaft 14 through the second shift sleeve 26. On the other hand, when the second shift sleeve 26 separates from the second transmission shaft 14, the engagement between the inner circumferential spline 26$si$ and the outer circumferential spline 14$so$ is released, and the third transmission shaft 16 becomes rotatable about the second transmission shaft 14.

The shift mechanism 10 further includes a driving drum 1, a first driven drum 30, and a second driven drum 32 that move the first shift sleeve 24 and the second shift sleeve 26 in the rotational axis direction. The driving drum 1, the first driven drum 30, and the second driven drum 32 are coaxially disposed on the rotational axis 18.

Figure 2:
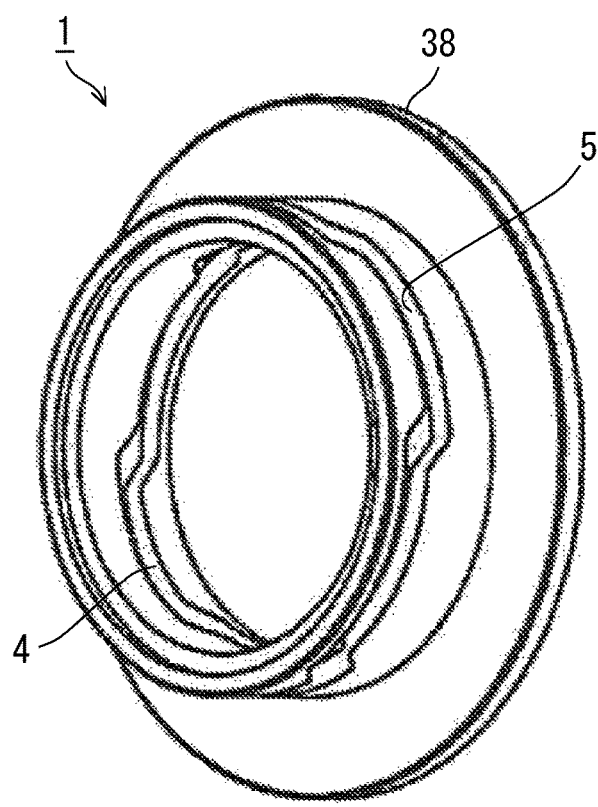
FIG. 2 is a perspective diagram showing a schematic structure of a driving drum.
Figure 5:
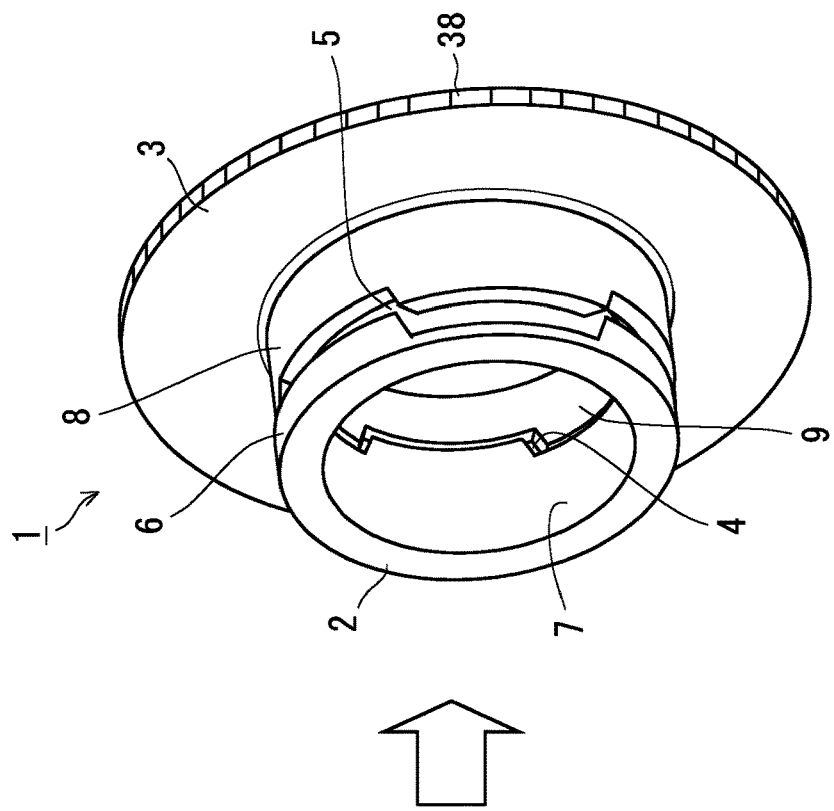
FIG. 5 shows perspective diagrams of a first cylindrical member, a second cylindrical member, and a driving drum according to a first embodiment of the present disclosure.
Figure 5:
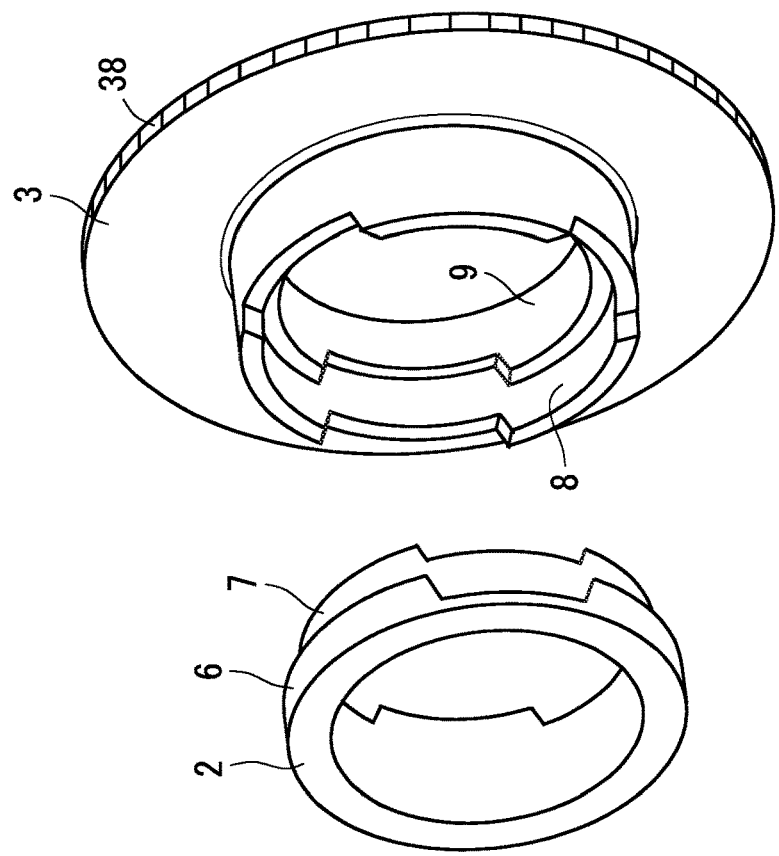
Figure 6:
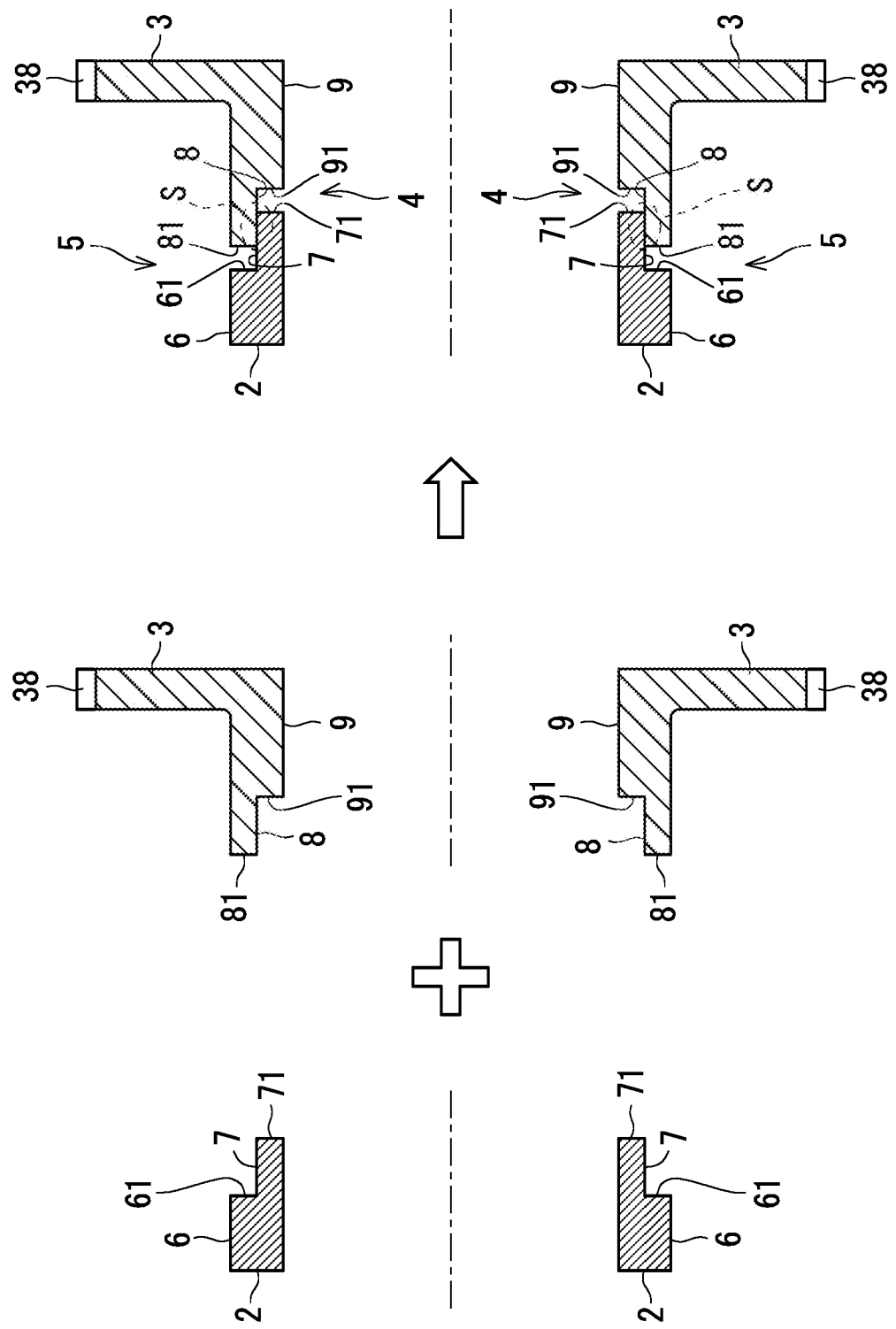
FIG. 6 shows sectional diagrams of the first cylindrical member, the second cylindrical member, and the driving drum shown in FIG. 5.

FIG. 2 is a perspective diagram showing a schematic structure of the driving drum. In FIG. 2 and FIGS. 5 and 6 (which will be described later), teeth of a gear 38 are omitted for the sake of simplifying the figures. The driving drum 1 is disposed on the rotational axis 18 in a rotatable manner and has a cylindrical shape. A first cam groove 4 is formed on an inner circumferential surface of the driving drum 1 in a circumferential direction thereof. A second cam groove 5 is formed on the outer circumferential surface of the driving drum 1 in a circumferential direction thereof.

The driving drum 1 is supported by bearings 34 and 36 in a rotatable manner with respect to the case 20. The driving drum 1 has the gear 38 such as a spur gear, a helical gear or the like. The gear 38 engages with a pinion (not shown) fixed to an output shaft of a shift motor (not shown). The driving drum 1 can be rotated by the shift motor.

Figure 3:
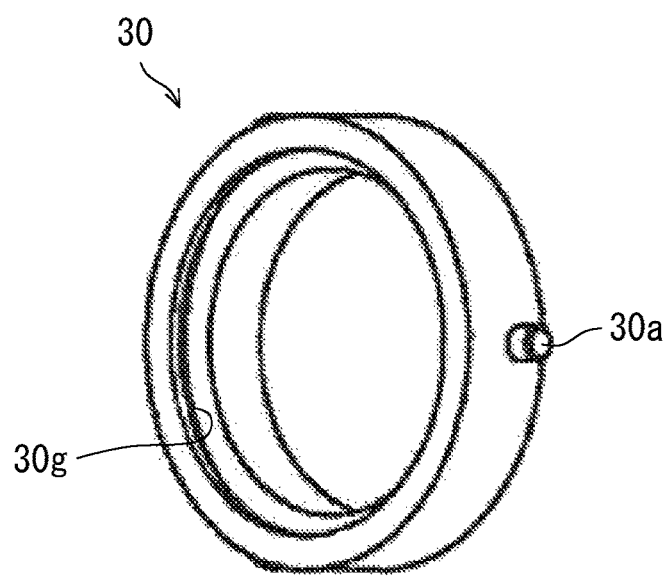
FIG. 3 is a perspective diagram showing a schematic structure of a first driven drum.

FIG. 3 is a perspective diagram showing a schematic structure of the first driven drum. The first driven drum 30 includes, on its outer circumferential surface, a first follower pin 30a that engages with the first cam groove 4. The first driven drum 30 moves along the rotational axis 18 as the first follower pin 30a follows the first cam groove 4 of the driving drum 1 when the driving drum 1 rotates.

The first driven drum 30 is positioned on the inner circumference side of the driving drum 1 and the first shift sleeve 24 is positioned on the inner circumference side of the first driven drum 30. The first driven drum 30 includes an inner circumferential spline 42 that engages with an outer circumferential spline 40 formed in the case 20. The first driven drum 30 is prevented from rotating about the case 20, that is, its movement in the rotational direction is restrained by the outer and inner circumferential splines 40 and 42. Meanwhile, the movement of the first driven drum 30 in the rotational axis direction is permitted. The outer and inner circumferential splines 40 and 42 may be replaced by a detent key and a key groove, respectively.

A holding groove 30g extending in the circumferential direction is disposed on an inner circumferential surface of the first driven drum 30, and the holding groove 30g holds the outward flange 24f of the first shift sleeve 24 in the groove. By this structure, the first driven drum 30 and the first shift sleeve 24 move along the rotational axis 18. Meanwhile, the first shift sleeve 24 can rotate in the rotational direction independently of the first driven drum 30. The outward flange 24f of the first shift sleeve 24 can be replaced by a plurality of protrusions arranged in the circumferential direction.

Figure 4:
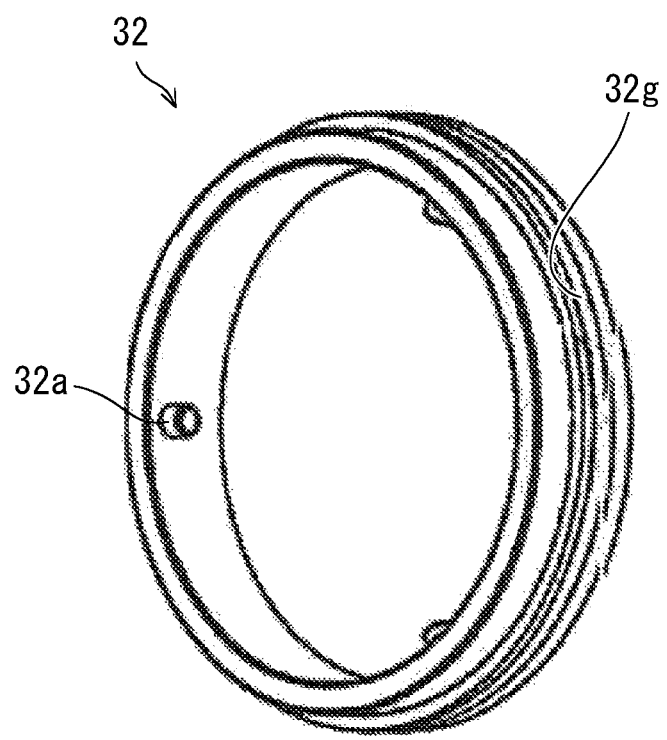
FIG. 4 is a perspective diagram showing a schematic structure of a second driven drum.

FIG. 4 is a perspective diagram showing a schematic structure of the second driven drum. The second driven drum 32 includes, on its inner circumferential surface, a second follower pin 32a that engages with the second cam groove 5. The second driven drum 32 moves along the rotational axis 18 as the second follower pin 32a follows the second cam groove 5 of the driving drum 1 when the driving drum 1 rotates.

The second driven drum 32 is positioned on the outer circumference side of the driving drum 1 and the second shift sleeve 26 is positioned on the outer circumference side of the second driven drum 32. The second driven drum 32 has a detent arm 44 extending outwardly in a radial direction.

A receiving hole 44h that receives a detent pin 46 fixed to the case 20 is formed to the detent arm 44. The detent pin 46 is received by the receiving hole 44h and is engaged with the detent arm 44. By this structure, the second driven drum 32 is locked from rotating about the case 20, that is, its movement in the rotational direction is restrained. Meanwhile, its movement in the rotational axis direction is permitted. The detent arm 44 and the detent pin 46 may be disposed at one position or at plurality of positions in the circumferential direction.

A holding groove 32g extending in the circumferential direction is disposed on the outer circumferential surface of the second driven drum 32. The holding groove 32g holds the inward flange 26f of the second shift sleeve 26 in the groove. By this structure, the second driven drum 32 and the second shift sleeve 26 move along the rotational axis 18. Meanwhile, the second shift sleeve 26 can rotate in the rotational direction independently of the second driven drum 32. The inward flange 26f of the second shift sleeve 26 can be replaced by a plurality of protrusions arranged in the circumferential direction.

Next, a relationship among the driving drum 1, the first driven drum 30, and the second driven drum 32 is explained in detail. The first cam groove 4 and the second cam groove 5 are formed on the inner circumferential surface and the outer circumferential surface, respectively, of a cylindrical part of the driving drum 1. The first cam groove 4 extends substantially in the circumferential direction and has a cam profile having projections and recesses in the rotational axis direction. The first cam groove 4 has, for example, a cam profile of three cycles. The first follower pin 30a of the first driven drum 30 is engaged with the first cam groove 4. Three first follower pins 30a are disposed at regular intervals so as to correspond to the cam profile of the first cam groove 4 having three cycles.

The second cam groove 5 extends substantially in the circumferential direction and has a cam profile having projections and recesses in the rotational axis direction. The second cam groove 5 has, for example, a cam profile of three cycles. The second follower pin 32a of the second driven drum 32 is engaged with the second cam groove 5. Three second follower pins 32a are disposed at regular intervals so as to correspond to the cam profile of the second cam groove 5 having three cycles. The cam profiles of the first and second cam grooves 4 and 5 can be the same as each other.

When the driving drum 1 rotates, the first and second follower pins 30a and 32a follow the cam profiles of the first and second cam grooves 4 and 5, and accordingly, the first and second driven drums 30 and 32 move in the rotational axis direction. The timing at which the first and second driven drums 30 and 32 move is determined according to the cam profiles of the first and second cam grooves 4 and 5 and the positions of the first and second follower pins 30a and 32a in the circumferential direction.

When the first driven drum 30 moves toward the second transmission shaft 14, that is, moves leftward in FIG. 1, the first shift sleeve 24 also moves toward the second transmission shaft 14, and the outer circumferential spline 24so of the first shift sleeve 24 engages with the inner circumferential spline 14si of the second transmission shaft 14. Accordingly, the first and second transmission shafts 12 and 14 are connected to each other and brought to a connected state.

When the first driven drum 30 moves in the opposite direction, that is, in the rightward direction in FIG. 1, the engagement between the outer and inner circumferential splines 24so and 14si is released, and the first and second transmission shafts 12 and 14 are separated from each other and brought to a disconnected state. As described above, the connected/disconnected state between the first and second transmission shafts 12 and 14 is switched by the movement of the first driven drum 30 in the direction of the rotational axis 18.

When the second driven drum 32 moves toward the second transmission shaft 14, that is, moves leftward in FIG. 1, the second shift sleeve 26 also moves toward the second transmission shaft 14, and the inner circumferential spline 26si of the second shift sleeve 26 engages with the outer circumferential spline 14so of the second transmission shaft 14. Accordingly, the second and third transmission shafts 14 and 16 are connected to each other and brought to a connected state.

When the second driven drum 32 moves in the opposite direction, that is, in the rightward direction in FIG. 1, the engagement between the inner and outer circumferential splines 26si and 14so is released. Accordingly, the second and third transmission shafts 14 and 16 are brought to a disconnected state. As described above, the connected/disconnected state between the second and third transmission shafts 14 and 16 is switched by the movement of the second driven drum 32 in the rotational axis direction.

In a state in which both of the first and second driven drums 30 and 32 have moved toward the second transmission shaft 14, the first and third transmission shafts 12 and 16 are brought to a state in which they are connected to each other via the second transmission shaft 14. Accordingly, the first to third transmission shafts 12, 14 and 16 become integrally rotatable.

In a state in which the first driven drum 30 has moved toward the second transmission shaft 14 and the second driven drum 32 has been separated from the second transmission shaft 14, the first and second transmission shafts 12 and 14 are connected with each other. By this connection, the third transmission shaft 16 becomes relatively rotatable with respect to the first and second transmission shafts 12 and 14.

In a state in which the first driven drum 30 has been separated from the second transmission shaft 14 and the second driven drum 32 has moved toward the second transmission shaft 14, the second and third transmission shafts 14 and 16 are connected with each other. By this connection, the first transmission shaft 12 becomes relatively rotatable with respect to the second and third transmission shafts 14 and 16. In a state in which both of the first and second driven drums 30 and 32 have been separated from the second transmission shaft 14, the first to third transmission shafts 12, 14, and 16 are separated from each other and they become rotatable independently of each other.

Note that the structure and the like of the shift mechanism 10 described above are disclosed in detail in Japanese Patent Application No. 2018-086858, and they can be employed in the present disclosure.

Meanwhile, in manufacturing the driving drum for the shift mechanism described above, conventionally, the first and second cam grooves are formed by performing a process for cutting the inner circumferential surface and the outer circumferential surface, respectively, of the cylindrical member by using a cutting tool. However, although the process for cutting the outer circumferential surface is relatively easy, the process for cutting the inner circumferential surface is more laborious since the interference between the cutting tool and the member needs to be considered. Accordingly, manufacturing time of the driving drum tends to increase. Specifically, since the first cam groove is formed on the inner circumferential surface and is formed as one circle composed of continuous curved line, its processing is difficult and its manufacturing cost is high.

In contrast to this, in the method of manufacturing the driving drum 1 according to the first embodiment, as shown in FIG. 5, each of the first and second cylindrical members 2 and 3 is molded and the molded first and second cylindrical members 2 and 3 are combined with each other, so that the first cam groove 4 and the second cam groove 5 are formed on the inner circumferential surface and the outer circumferential surface, respectively, of the cylindrical part of the driving drum 1.

Therefore, there is no need to perform the process for cutting the inner surface and the outer circumferential surface, respectively, of the cylindrical member by using the cutting tool, and the driving drum 1 can be manufactured by a simple method of separately molding the first and second cylindrical members 2 and 3 and combining the molded first and second cylindrical members 2 and 3 with each other. Accordingly, the driving drum 1 can be manufactured in a short time.

Figure 7:
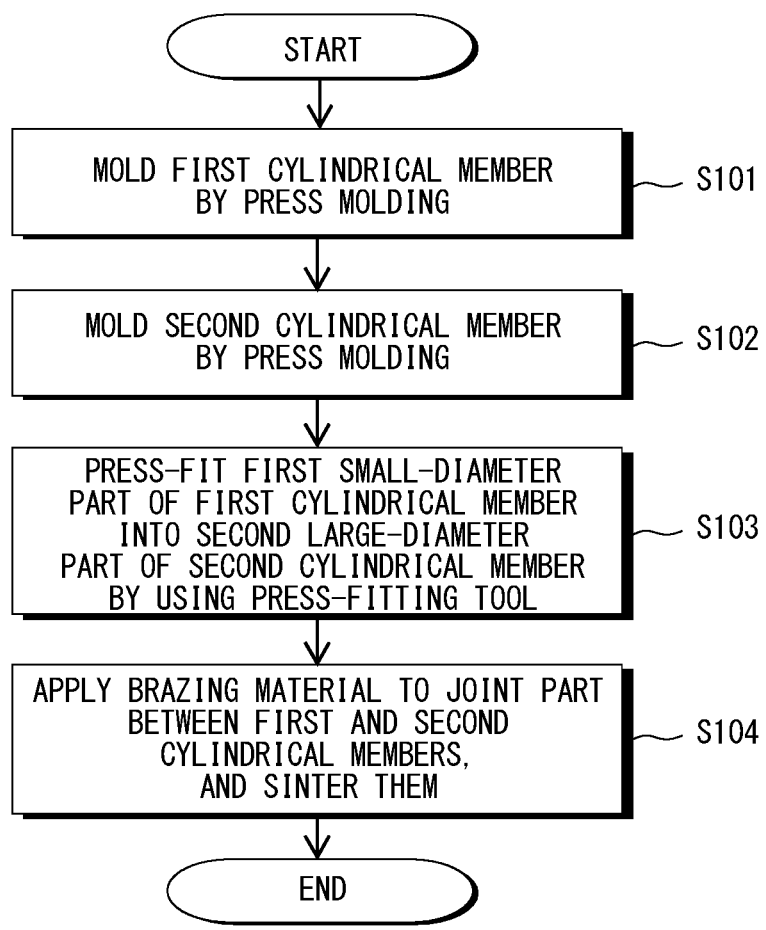
FIG. 7 is a flowchart showing a flow of a method of manufacturing a driving drum according to the first embodiment of the present disclosure.

FIG. 6 shows sectional diagrams of the first cylindrical member, the second cylindrical member, and the driving drum shown in FIG. 5. FIG. 7 is a flowchart showing a flow of the method of manufacturing the driving drum according to the first embodiment.

First, a first cylindrical member 2 including a first large-diameter part 6 and a first small-diameter part 7 is molded by employing press molding or the like (Step S101).

A diameter of an outer circumferential surface of the first small-diameter part 7 is smaller than a diameter of an outer circumferential surface of the first large-diameter part 6. A diameter of an inner circumferential surface of the first small-diameter part 7 and a diameter of an inner circumferential surface of the first large-diameter part 6 are equal to each other. Projections and recesses in the rotational axis direction on an end face 71 of the first small-diameter part 7 of the first cylindrical member 2 are formed so as to conform to a cam profile of the first cam groove 4. Projections and recesses in the rotational axis direction on an end face 61 of the first large-diameter part 6 of the first cylindrical member 2 are formed so as to conform to a cam profile of the second cam groove 5.

The second cylindrical member 3 including the second large-diameter part 8 and the second small-diameter part 9 is molded by employing press molding or the like (Step S102).

The inner circumferential surface of the second large-diameter part 8 of the second cylindrical member 3 has a diameter that corresponds to and is substantially equal to the diameter of the outer circumferential surface of the first small-diameter part 7 of the first cylindrical member 2. The inner circumferential surface of the second small-diameter part 9 of the second cylindrical member 3 has a diameter that corresponds to and is substantially equal to the diameter of the inner circumferential surface of the first small-diameter part 7 of the first cylindrical member 2. The diameter of the inner circumferential surface of the second small-diameter part 9 is smaller than the diameter of the inner circumferential surface of the second large-diameter part 8. The diameter of the outer circumferential surface of the second small-diameter part 9 and the diameter of the outer circumferential surface of the second large-diameter part 8 are equal to each other.

Projections and recesses in the rotational axis direction on an end face 91 of the second small-diameter part 9 of the second cylindrical member 3 correspond to the projections and recesses in the rotational axis direction on the end face 71 of the first small-diameter part 7 of the first cylindrical member 2. The projections and recesses in the rotational axis direction on the end face 91 of the second small-diameter part 9 of the second cylindrical member 3 are formed so as to conform to the cam profile of the first cam groove 4.

Projections and recesses in the rotational axis direction on an end face 81 of the second large-diameter part 8 of the second cylindrical member 3 correspond to the projections and recesses in the rotational axis direction on the end face 61 of the first large-diameter part 6 of the first cylindrical member 2. The projections and recesses in the rotational axis direction on the end face 81 of the second large-diameter part 8 of the second cylindrical member 3 are formed so as to conform to the cam profile of the second cam groove 5.

At a position where the projections and recesses on the end face 91 of the second small-diameter part 9 of the second cylindrical member 3 and the projections and recesses on the end face 71 of the first small-diameter part 7 of the first cylindrical member 2 correspond to each other, and the projections and recesses on the end face 81 of the second large-diameter part 8 of the second cylindrical member 3 and the projections and recesses on the end face 61 of the first large-diameter part 6 of the first cylindrical member 2 correspond to each other, the first small-diameter part 7 of the first cylindrical member 2 is press-fitted into the second large-diameter part 8 of the second cylindrical member 3 by using a press-fitting tool or the like (Step S103).

Accordingly, the first cam groove 4 is formed between the end face 71 of the first small-diameter part 7 of the first cylindrical member 2 and the end face 91 of the second small-diameter part 9 of the second cylindrical member 3, and the second cam groove 5 is formed between the end face 61 of the first large-diameter part 6 of the first cylindrical member 2 and the end face 81 of the second large-diameter part 8 of the second cylindrical member 3.

The press-fitting tool may be provided with a mark or a guide so that the first cylindrical member 2 is press-fitted into the second cylindrical member 3 at a predetermined depth at the position where the projections and recesses on the end face 91 of the second small-diameter part 9 of the second cylindrical member 3 and the projections and recesses on the end face 71 of the first small-diameter part 7 of the first cylindrical member 2 correspond to each other, and the projections and recesses on the end face 81 of the second large-diameter part 8 of the second cylindrical member 3 and the projections and recesses on the end face 61 of the first large-diameter part 6 of the first cylindrical member 2 correspond to each other. In this way, it is possible to precisely determine the depth (the width of the first and second cam grooves 4 and 5) and a phase in the circumferential direction at which the first small-diameter part 51 of the first cylindrical member 50 is press-fitted into the second large-diameter part 54 of the second cylindrical member 53.

After the first small-diameter part 7 of the first cylindrical member 2 is press-fitted into the second large-diameter part 8 of the second cylindrical member 3, a brazing material is applied to their joint part S and then they are sintered (Step S104). During this sintering process, the brazing material melts and flows into a joint interface between the first and second cylindrical members 2 and 3. After the sintering process, as the brazing material cools and solidifies, the first and second cylindrical members 2 and 3 are joined to each other. The manufacturing cost can be reduced by effectively employing the sintering as described above.

As described above, in the method of manufacturing the driving drum 1 according to the first embodiment, each of the first and second cylindrical members 2 and 3 is molded, and the first small-diameter part 7 of the first cylindrical member 2 is press-fitted into the second large-diameter part 8 of the second cylindrical member 3, so that the first cam groove 4 is formed between the end face 71 of the first small-diameter part 7 of the first cylindrical member 2 and the end face 91 of the second small-diameter part 9 of the second cylindrical member 3, and the second cam groove 5 is formed between the end face 61 of the first large-diameter part 6 of the first cylindrical member 2 and the end face 81 of the second large-diameter part 8 of the second cylindrical member 3.

In this way, the driving drum 1 can be manufactured by a simple method of separately molding the first and second cylindrical members 2 and 3 and combining the molded first and second cylindrical members 2 and 3 with each other. Accordingly, the driving drum 1 can be manufactured in a short time.

Second Embodiment

Figure 8:
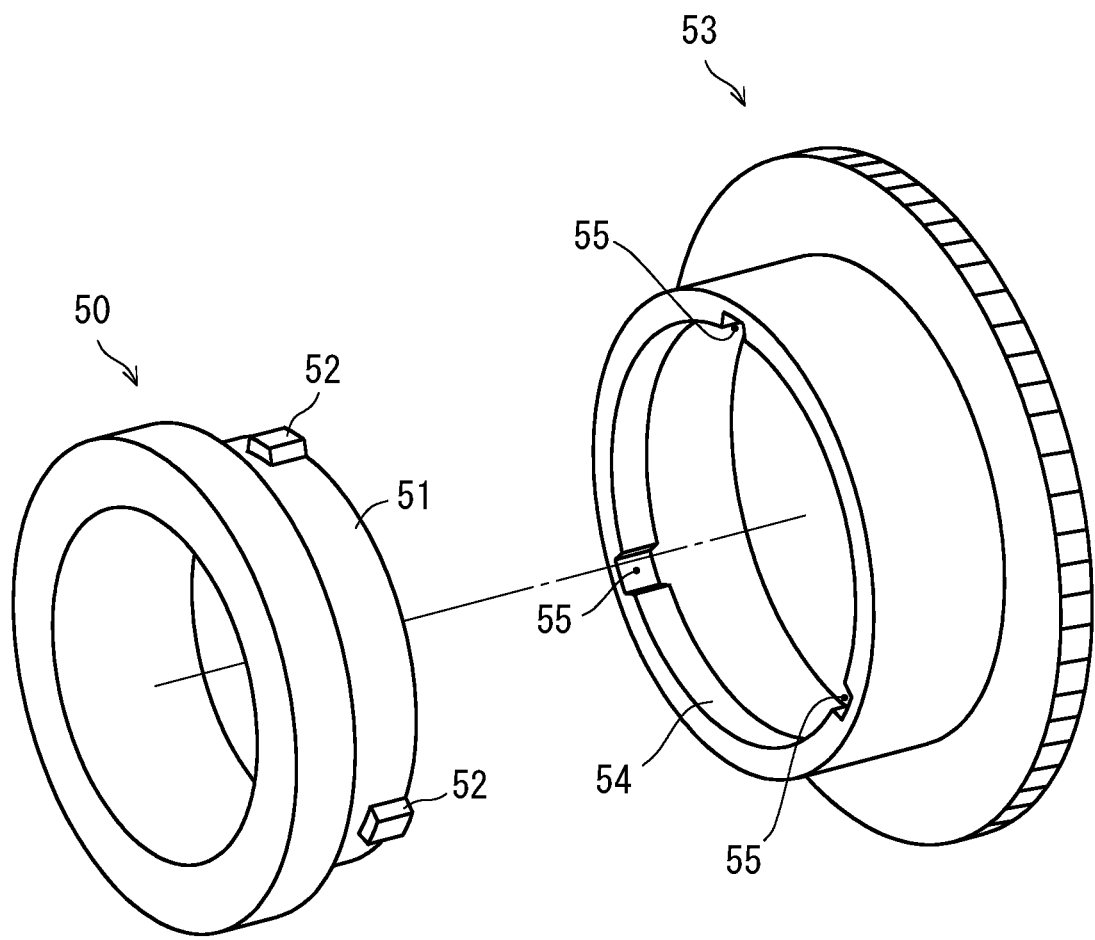
FIG. 8 shows perspective diagrams of first and second cylindrical members according to a second embodiment of the present disclosure.

FIG. 8 shows perspective diagrams of first and second cylindrical members according to a second embodiment of the present disclosure. In the second embodiment, a plurality of projections 52 that protrude on the outer diameter side are formed on an outer circumferential surface of the first small-diameter part 51 of the first cylindrical member 50. A plurality of recesses 55 into which the projections 52 of the first small-diameter part 51 of the first cylindrical member 2 are fitted are formed on an inner circumferential surface of the second large-diameter part 54 of the second cylindrical member 53.

For example, although not limited thereto, three of the projections 52 are formed at substantially regular intervals on the outer circumferential surface of the first small-diameter part 51 of the first cylindrical member 50. The number and the position of the projections 52 formed on the outer circumferential surface of the first small-diameter part 51 of the first cylindrical member 50 may be determined arbitrarily.

It is possible to precisely determine a depth and a phase in the circumferential direction at which the projections 52 of the first small-diameter part 51 of the first cylindrical member 50 are fitted into the recesses 55 of the second large-diameter part 54 of the second cylindrical member 53 by fitting the projections 52 of the first small-diameter part 51 of the first cylindrical member 50 into the recesses 55 of the second large-diameter part 54 of the second cylindrical member 53.

Note that a plurality of recesses may be formed on an outer circumferential surface of the first small-diameter part of the first cylindrical member, and a plurality of projections may be formed on the inner circumferential surface of the second large-diameter part of the second cylindrical member onto which the recesses of the first small-diameter part of the first cylindrical member are fitted.

Figure 9:
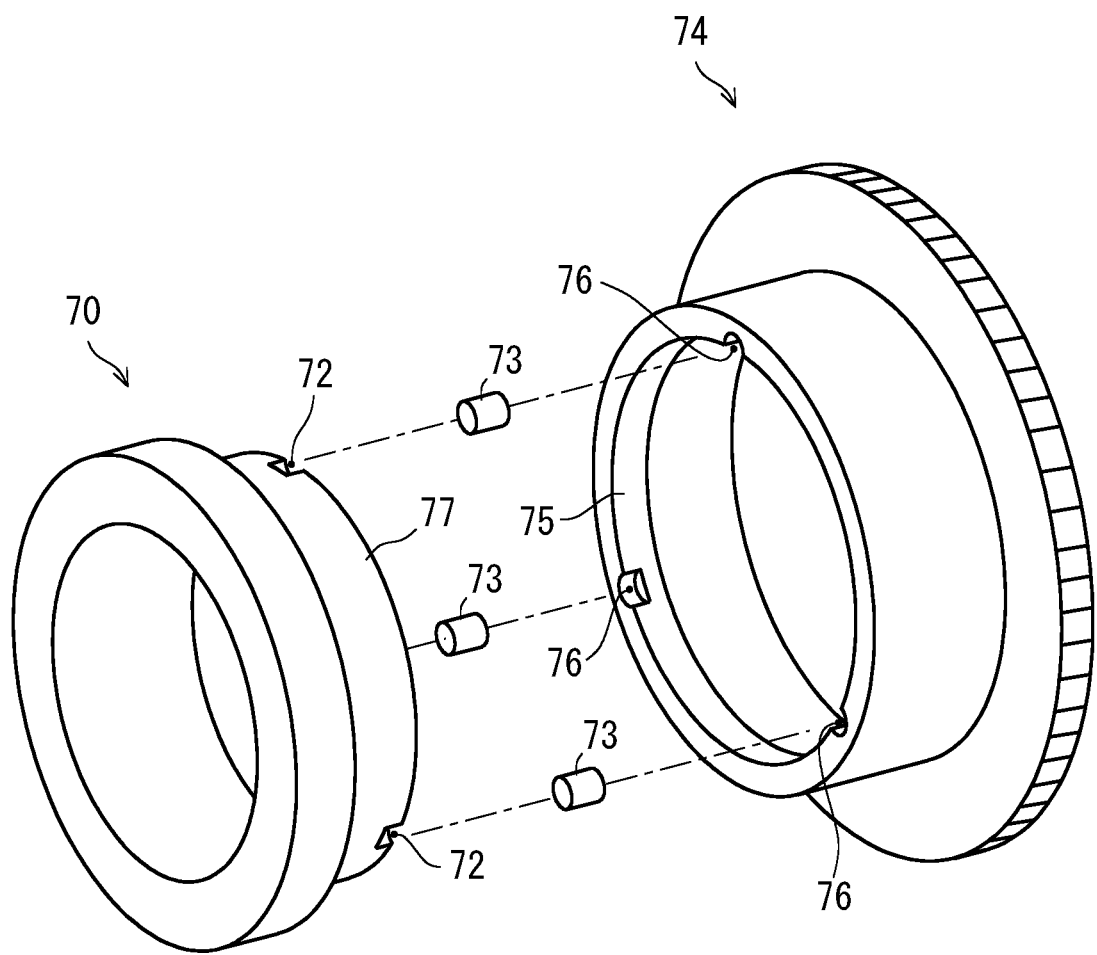
FIG. 9 is a diagram showing a modified example in which recessed parts are formed on an outer circumferential surface of a first small-diameter part of the first cylindrical member so that pin members are fitted thereto.

Further, as shown in FIG. 9, recesses 72 into which pin members 73 are fitted may be formed on the outer circumferential surface of a first small-diameter part 77 of a first cylindrical member 70. A plurality of recesses 76 into each of which one of the pin member 73 is fitted are also formed on the inner circumferential surface of a second large-diameter part 75 of a second cylindrical member 74. By this structure, it is possible to precisely determine a depth and a phase in the circumferential direction at which the first cylindrical member 50 is press-fitted into the second cylindrical member 53 by sandwiching the pin members 73 with the recesses 72 of the first small-diameter part 77 of the first cylindrical member 70 and the recesses 76 of the second large-diameter part 75 of the second cylindrical member 74.

Embodiments of the present disclosure have been explained with reference to several embodiments. However, these embodiments are merely given as examples and are not intended to limit the scope of the disclosure. These novel embodiments can be implemented in various other ways and various omissions, replacements, or modifications can be made without departing from the spirit and the scope of the disclosure. These embodiments and modifications made thereto are included in the scope of the claims and their equivalents as well as in the gist of the disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of manufacturing a driving drum for a shift mechanism, the shift mechanism including the driving drum disposed on a rotational axis in a rotatable manner, the driving drum having a cylindrical shape, and including a first cam groove on an inner circumferential surface in a circumferential direction of the driving drum and a second cam groove on an outer circumferential surface in a circumferential direction of the driving drum, wherein a position of the first cam groove along the inner circumferential surface changes in a direction of the rotational axis and a position of the second cam groove along the outer circumferential surface changes in the direction of the rotational axis; a first driven drum configured to engage with the first cam groove and move along the rotational axis in accordance with a rotation of the driving drum; and a second driven drum configured to engage with the second cam groove and move along the rotational axis in accordance with the rotation of the driving drum; the method comprising:

molding a first cylindrical member including a first large-diameter part and a first small-diameter part, a diameter of an outer circumferential surface of the first small-diameter part being smaller than a diameter of an outer circumferential surface of the first large-diameter part;

molding a second cylindrical member having a second large-diameter part and a second small-diameter part, a diameter of an inner circumferential surface of the second large-diameter part corresponding to the diameter of the outer circumferential surface of the first small-diameter part of the first cylindrical member, a diameter of an inner circumferential surface of the second small-diameter part corresponding to the diameter of the inner circumferential surface of the first small-diameter part of the first cylindrical member, and the diameter of the inner circumferential surface of the second small-diameter part being smaller than the diameter of the inner circumferential surface of the second large-diameter part; and press-fitting the first small-diameter part of the first cylindrical member into the second large-diameter part of the second cylindrical member, thereby forming the first cam groove between an end face of the first small-diameter part of the first cylindrical member and an end face of the second small-diameter part of the second cylindrical member and forming the second cam groove between an end face of the first large-diameter part of the first cylindrical member and an end face of the second large-diameter part of the second cylindrical member.

2. The method of manufacturing the driving drum according to claim 1, further comprising applying a brazing material to a joint part between the first small-diameter part of the first cylindrical member and the second large-diameter part of the second cylindrical member, and then sintering the brazing material, the first cylindrical member and the second cylindrical member.

3. The method of manufacturing the driving drum according to claim 1 wherein a plurality of projections are formed on the outer circumferential surface of the first small-diameter part of the first cylindrical member, and a plurality of recesses are formed on the inner circumferential surface of the second large-diameter part of the second cylindrical member so that the projections of the first small-diameter part of the first cylindrical member are fitted into the recesses of the second large-diameter part of the second cylindrical member, or a plurality of recesses are formed on the outer circumferential surface of the first small-diameter part of the first cylindrical member, and a plurality of projections are formed on the inner circumferential surface of the second large-diameter part of the second cylindrical member so that the recesses of the first small-diameter part of the first cylindrical member are fitted onto the projections of the second large-diameter part of the second cylindrical member.

4. The method of manufacturing the driving drum according to claim 1, further comprising forming the end face of the first small-diameter part and the end face of the second small-diameter part to have projections and recesses along the rotational axis, and forming the end face of the first large-diameter part and the end face of the second large-diameter part to have projections and recesses along the rotational axis.

* * * * *